(12) United States Patent
Rabii

(10) Patent No.: US 8,639,232 B2
(45) Date of Patent: Jan. 28, 2014

(54) SYSTEM AND METHOD TO MANAGE PROCESSES OF A MOBILE DEVICE BASED ON AVAILABLE POWER RESOURCES

(75) Inventor: Khosro M. Rabii, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 12/894,734

(22) Filed: Sep. 30, 2010

(65) Prior Publication Data

US 2012/0083258 A1 Apr. 5, 2012

(51) Int. Cl.
*H04M 3/00* (2006.01)

(52) U.S. Cl.
USPC .......................... 455/418; 455/567; 455/574

(58) Field of Classification Search
USPC ............. 455/414.1, 450, 452.1, 550.1, 556.1, 455/567, 574, 575.1, 343.1, 343.2, 343.3, 455/418, 419
See application file for complete search history.

(56) References Cited

U.S. PATENT DOCUMENTS

| | | | |
|---|---|---|---|
| 8,175,516 B2 * | 5/2012 | Nakao et al. | 455/556.1 |
| 2005/0261037 A1 * | 11/2005 | Raghunath et al. | 455/574 |
| 2007/0173221 A1 | 7/2007 | Kang | |
| 2007/0190979 A1 * | 8/2007 | Hatano | 455/414.1 |
| 2007/0249395 A1 * | 10/2007 | Kondo et al. | 455/556.1 |
| 2009/0054100 A1 | 2/2009 | Ishida | |
| 2009/0187780 A1 | 7/2009 | Keohane et al. | |

FOREIGN PATENT DOCUMENTS

| | | |
|---|---|---|
| EP | 1768409 A1 | 3/2007 |
| GB | 2415335 A | 12/2005 |
| JP | 2006019476 | 1/2006 |
| JP | 2006019486 | 1/2006 |
| JP | 2007158637 A | 6/2007 |
| JP | 2007235527 A | 9/2007 |
| WO | 2007086438 A1 | 8/2007 |

OTHER PUBLICATIONS

Luna, Carlos E. et al. "Joint Source Coding and Data Rate Adaptation for Energy Efficient Wireless Video Streaming," IEEE Journal on Selected Areas in Communications, vol. 21, No. 10, Dec. 2003, pp. 1710-1720.
International Search Report and Written Opinion—PCT/US2011/054169—ISA/EPO—Jan. 25, 2012.

* cited by examiner

*Primary Examiner* — Thanh Le
(74) *Attorney, Agent, or Firm* — Michael DeHaemer; Elaine H. Lo

(57) ABSTRACT

A system and method to manage processes of a mobile device based on available power resources is disclosed. In a particular embodiment, an apparatus is disclosed that includes an interface configured to receive a user selection of a scheduled program to be received at a mobile device. The apparatus also includes a battery threshold calculator configured to determine a battery charge threshold based on at least one of a duration of the scheduled program and a processing complexity of the scheduled program. The apparatus includes an alert generator configured to generate a battery alert notification prior to receiving the scheduled program in response to a determination that a battery charge of the mobile device at a starting time of the scheduled program does not satisfy the battery charge threshold.

25 Claims, 9 Drawing Sheets

SYSTEM AND METHOD TO MANAGE PROCESSES OF A MOBILE DEVICE BASED ON AVAILABLE POWER RESOURCES

FIELD

The current disclosure is generally related to managing processes of a mobile device based on available power resources.

DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Processing data consumes power resources of computing devices. In general, the more complex the process, the more power is consumed to complete the process. The computing capabilities of a mobile computing device may be restricted by the power available from a battery. As the complexity of the processes that are performed by the mobile computing device increases, the ability of the mobile device to manage the processes to conserve the battery becomes beneficial.

SUMMARY

A mobile device is described that has access to an electronic program guide. From the electronic program guide, a user of the mobile device may select a scheduled program to record. The mobile device may determine or estimate an amount of battery charge that would be consumed to record, download, or playback the selected program. The amount of battery charge may be calculated based on a duration of the selected program and a processing complexity of the selected program. For example, a long, high definition (HD) program may consume more power to process than a short, standard definition (SD) program. The mobile device may then compare a measured or estimated battery charge of the mobile device to the amount of battery charge to record the selected program. The battery charge calculation can be at a time of download or at a starting time of the scheduled program. When the mobile device does not have enough remaining battery charge to record, download, or playback the selected program, an alert message may be provided to the user. Based on the alert message, the user may take an action, such as to change the complexity of the program (e.g., record the program in SD instead of HD), increase the power resources of the mobile device (e.g., plug in the mobile device), or may cancel the scheduled program.

In a particular embodiment, an apparatus includes an interface configured to receive a user selection of a scheduled program to be received at a mobile device. The apparatus also includes a battery threshold calculator configured to determine a battery charge threshold based on at least one of a duration of the scheduled program and a processing complexity of the scheduled program. The apparatus includes an alert generator configured to generate a battery alert notification prior to receiving the scheduled program in response to a determination that a battery charge of the mobile device at a starting time of the scheduled program would not satisfy the battery charge threshold.

In a particular embodiment, a method of scheduling receipt of content at a mobile device is disclosed. The method includes receiving a user selection of a scheduled program to be received at the mobile device. The method also includes determining a battery charge threshold based on at least one of a duration of the scheduled program and a processing complexity of the scheduled program. The method includes determining a battery charge of the mobile device at a starting time of the scheduled program. The method also includes generating a battery alert notification prior to receiving the scheduled program in response to determining that the battery charge of the mobile device fails to satisfy the battery charge threshold.

One particular advantage provided by at least one of the disclosed embodiments is that a mobile communication device may alert a user to a potential power resource issue corresponding to a scheduled recording of a program before the recording of the program begins. Based on the alert, the user may take action, such as to make changes to either the scheduled program or the mobile device that may improve the likelihood that the mobile device will be able to complete the scheduled recording.

Other aspects, advantages, and features of the disclosure will become apparent after review of the entire application, including the following sections: Brief Description of the Drawings, Detailed Description, and the Claims.

DETAILED DESCRIPTION

Figure 1:
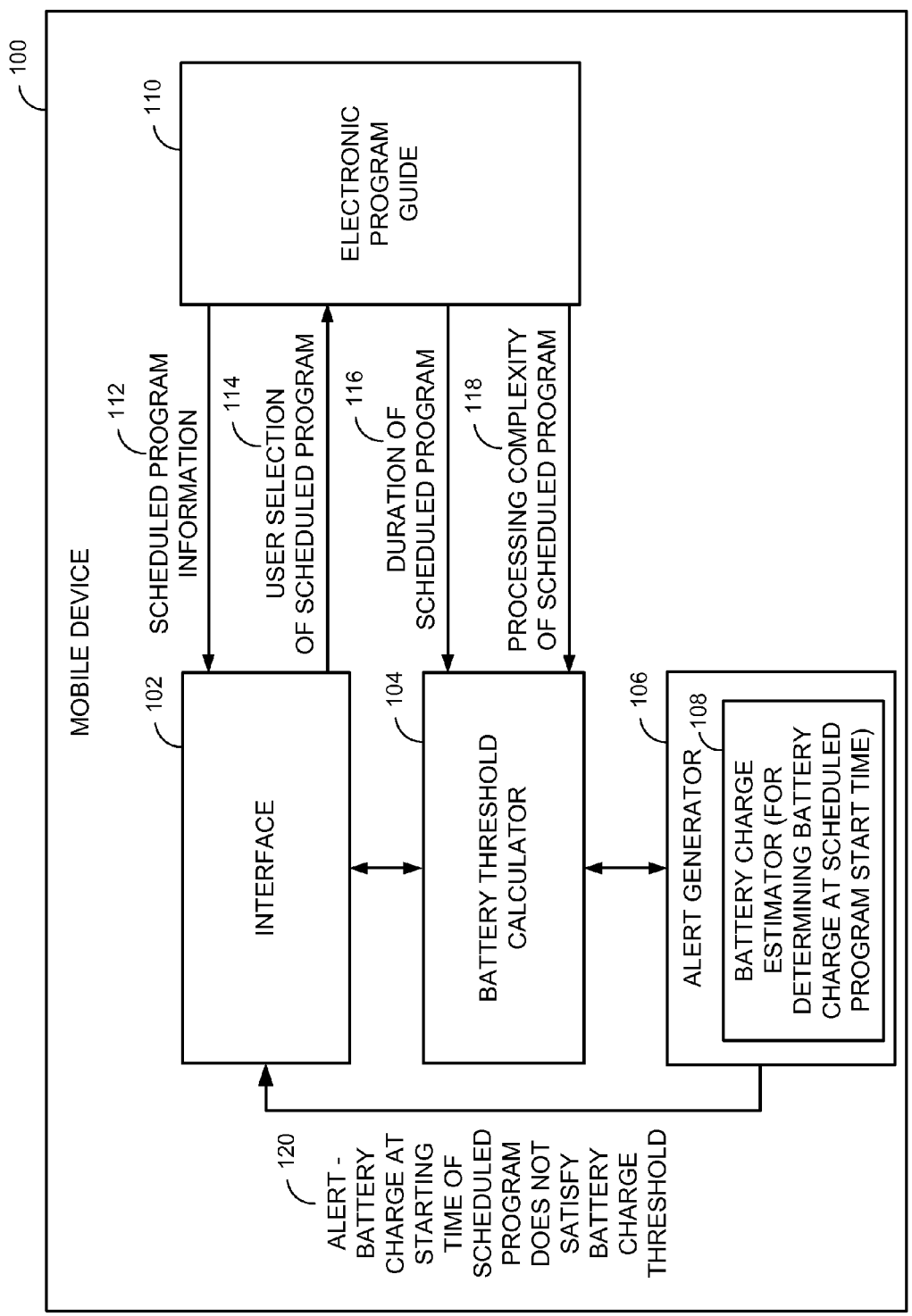
FIG. 1 is a block diagram of a first embodiment of a mobile device that generates an alert based on a determination that the mobile device does not have sufficient power resources to record a scheduled program.

Referring to FIG. 1, a first embodiment of a mobile device 100 that generates an alert 120 based on a determination that the mobile device 100 does not have sufficient power resources to record a scheduled program is shown. The mobile device 100 may include an interface 102, a battery threshold calculator 104, an electronic program guide 110, and an alert generator 106 that includes a battery charge estimator 108. When the mobile device 100 generates the alert 120 indicating that the power resources to receive the scheduled program exceed the power resources of the mobile device 100, a user of the mobile device 100 may take action to improve a likelihood of a successful recording of the scheduled program. For example, the user may plug in the mobile device to an external power source or change the format of the scheduled program to reduce the power required to record the scheduled program.

The interface 102 may be a graphical user interface (GUI) that enables a user to interact with information received from other components of the mobile device 100. For example, the interface 102 may display content, such as scheduled program information 112, at the mobile device 100. From the scheduled program information 112, the user may select a scheduled program 114 and the user selection 114 of the scheduled program may be provided to the electronic program guide 110. As another example, the interface 102 may be configured to display messages, such as an alert generated by the alert generator 106. In this case, the user may take action, such as to reschedule or change the programming based on the information presented in the alert 120.

The electronic program guide 110 may be configured to process and indicate information pertaining to scheduled programming. The electronic program guide 110 may include information that is downloaded to the mobile device 100 from a content source or a service provider. The electronic program guide 110 may be configured to exchange information with other components of the mobile device 100. For example, the electronic program guide 110 may provide the scheduled program information 112 to the interface 102 and may receive the user selection 114 of the scheduled program. In response to receiving the user selection 114 of the scheduled programming, the electronic program guide 110 may transmit information about the selected scheduled program, such as a duration 116 and processing complexity 118 of the selected scheduled program to the battery threshold calculator 104.

The battery threshold calculator 104 may be configured to receive indications of tasks to be performed by the mobile device 100 and to determine a battery threshold needed to perform these tasks. The battery threshold calculator 104 may be configured to determine the battery threshold based on the information about the selected scheduled program from the electronic program guide 110. For example, based on the duration 116 and the processing complexity 118 of the selected scheduled program, the battery threshold calculator 104 may determine that the selected scheduled program would require the mobile device 100 to have at least a 50% power level. The battery threshold calculator 104 may be configured to provide the battery threshold to the alert generator 106.

A battery charge estimator 108 of the alert generator 106 may be configured to determine (e.g. measure) a battery charge level of the mobile device 100. The battery charge may be determined based on a characteristic of the power resources of the mobile device 100. For example, when the mobile device 100 has a highly charged battery, the battery charge may be estimated to last several hours. As another example, when the mobile device 100 is connected to an external power source, the battery charge may be estimated to last indefinitely. In addition, the types of processes scheduled for execution by the mobile device 100 may impact the determination of the battery charge at the starting time of the selected program. For example, when the mobile device 100 is running multiple applications, the power resources of the mobile device 100 may be depleted at a faster rate than when the mobile device is only running one application. As another example, processes that use network bandwidth may impact the battery power of the mobile device 100. In a particular embodiment, the battery charge may be determined at a starting time of the scheduled program. For example, when the starting time of the scheduled program occurs a future time, the battery charge estimator 108 may determine a future estimated battery charge of the mobile device 100 based on the starting time.

The battery charge estimator 108 may be configured to compare the battery charge of the mobile device 100 to the battery charge threshold to determine whether the mobile device 100 includes sufficient power to record the selected scheduled program at the starting time of the selected program. For example, when the battery threshold indicates that the mobile device requires 80% battery power to record a two-hour high definition movie but the battery charge of the mobile device is only 50% (or is predicted, prior to the starting time, to be at 50% when the selected program begins), the battery charge estimator 108 may determine that the mobile device 100 has insufficient power resources to complete a recording of the selected program. In response to a determination that the mobile device 100 lacks the power resources to record the selected program (or that the mobile device 100 is predicted to lack the resources at the starting time of the selected program), the alert generator 106 may generate the alert 120 warning the user of the potential power resource issue.

During operation, the mobile device 100 may present a user with an electronic program guide that enables the user to select a program to record. The battery threshold calculator 104 may determine the battery threshold required to record the selected program based on information about the selected program received from the electronic program guide 110. The alert generator 106 may determine (e.g. measure, calculate, or estimate) the battery charge of the mobile device 100 and whether the battery charge satisfies the battery threshold. When the determined battery charge does not or will not satisfy the battery threshold, the alert generator 106 may provide the user with the alert 120. Based on the alert 120, the user may change one or more conditions of the mobile device 100 (e.g., charge the battery, turn off other processes, turn down screen brightness) or change the conditions of the program (e.g., select a standard definition version of the program instead of a high definition version).

Determining whether the mobile device 100 does not contain sufficient power resources (or that the mobile device 100 is predicted to lack the resources at the starting time of the selected program) to receive or record a program based on the duration 116 and the processing complexity 118 of the program enables the user to be alerted of the potential power resource issue in advance of a potential low battery condition. Advanced notification has the potential benefit of presenting the user with choices that may not be available after the recording of the program has begun. For example, once a program has started recording, switching from high definition to standard definition may not be possible or may be inconvenient.

Figure 2:
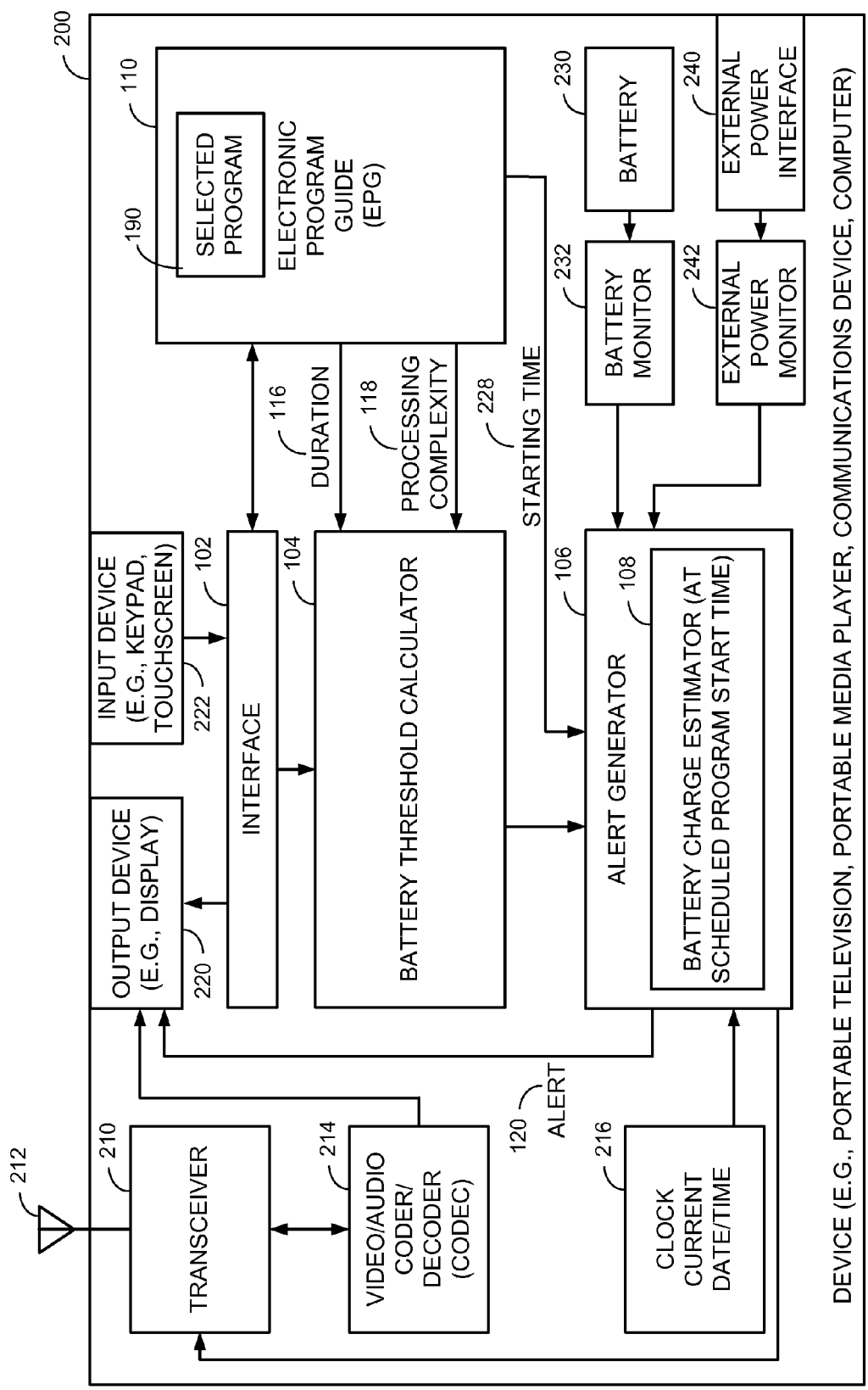
FIG. 2 is a block diagram depicting further details of the embodiment of the mobile device of FIG. 1.

Referring to FIG. 2, a second embodiment of a mobile device 200 that generates an alert 120 based on a determination that the mobile device 200 does not have sufficient power resources to record a scheduled program at the starting time of the scheduled program is shown. The mobile device 200 includes the interface 102, the battery threshold calculator 104, the electronic program guide 110, and the alert generator 106. The mobile device 200 may also include an output device 220 (e.g., display) and an input device 222 (e.g., keypad, touchscreen). The mobile device 200 may include a video/audio coder/decoder (CODEC) 214 and an antenna 212 that communicates with a transceiver 210. The mobile device 200 also includes a clock module 216 that provides current date/time information, a battery monitor 232 that monitors a battery 230, and an external power monitor 242 that monitors an external power interface 240. Based on the alert 120, a user of the mobile device 200 may make changes to the power resources of the mobile device 200 or to the scheduling of the program recording.

In a particular embodiment, the interface 102 is configured to receive input from the input device 222. For example, a user of the mobile device 200 may touch a keypad or touchscreen. The interface 102 may also be configured to output content to the output device 220. For example, the interface 102 may be configured to present the electronic program guide 110 that lists one or more programs. In addition, the output device 220 may be configured to receive content from the video/audio CODEC 214 and the alert generator 106.

In a particular embodiment, the alert generator 106 is configured to receive a starting time 228 associated with the selected program 190 from the electronic program guide 110. The alert generator 106 is also configured to receive information from the battery monitor 232 which measures a battery power level of the battery 230. The alert generator 106 may also be configured to determine whether an external power source is providing power to the mobile device 200. For example, the alert generator 106 may receive information from the external power monitor 242 which monitors the external power interface 240. The alert generator 106 may also be configured to receive a current time from the clock module 216.

In a particular embodiment, the battery charge estimator 108 is configured to determine whether the power resources of the mobile device 200 would be sufficient to record the selected program 190 based on information received at the alert generator 106. For example, the alert generator 108 may use the starting time 228 of the selected program 112 and the current time received from the clock module 216. When the starting time 228 of the selected program 190 is at or before the current time (e.g., the selected program 190 is in progress), the battery threshold calculator 104 may be configured to determine the battery charge threshold based on a remaining duration of the selected program 190. If the battery charge estimator 108 determines that the battery charge at the current time does not satisfy the battery charge threshold, the alert generator 106 may immediately generate a battery alert notification (e.g., the alert 120). When the starting time 228 indicates that the selected program 190 will be received at a future time, the battery charge estimator 108 may be configured to estimate the amount of battery drain between the current time and the starting time 228. If the battery charge estimator 108 determines that an estimated battery charge at the starting time 228 does not (or is estimated to not) satisfy the battery charge threshold, the alert generator 106 may be configured to send at the alert 120 immediately.

The alert generator 120 may also be configured to determine at one or more times in advance of the future time (e.g., the starting time 228) whether the estimated battery charge satisfies the battery charge threshold. For example, the battery charge estimator 108 may be configured to periodically perform a battery check prior to the starting time 228 to determine the estimated battery charge. In this case, if the alert generator 106 determines that the estimated battery charge does not satisfy the battery charge threshold, the alert generator 106 may send the alert 120.

During operation, the interface 102 enables the user to make a selection of a program to record based on the electronic program guide 110. The interface 102 provides the selection to the electronic program guide 110 which provides an indication of duration 116 and complexity 118 to the battery threshold calculator 104. For example, the complexity 118 may be indicated as a number between one and ten. The battery threshold calculator 104 determines the amount of battery power required to perform the recording (or download, playback) (i.e., the battery charge threshold). The alert generator 106 compares the amount of battery power estimated to be available to the amount of battery power estimated to be required to perform the recording. The battery charge estimator 108 may determine that the external power interface 240 is not receiving power, and therefore, the mobile device 200 is powered solely based on the battery 230. Based on current or expected usage (e.g., running processes, network conditions, etc.), the battery charge estimator 108 may estimate battery power that would be available at the start time 228. The battery charge estimator 108 may compare the battery charge threshold to the estimated amount of battery power that the mobile device 200 would have at the start time 228. If the battery charge estimator 108 determines that the mobile device 200 would have insufficient power at the start time 228 to perform the recording of the programming, the alert generator 106 may send the alert 120 to the output device 220. In this case, the user may determine whether to make changes to the scheduling of the selected program 190. For example, by changing the processing complexity 118 of the selected program 190 by switching from a higher resolution to a lower resolution, the mobile device 200 may decrease the amount of power required to perform the recording (or other operation). The user may also determine to plug in an external power source to the external power interface 240.

Scheduling tasks at the mobile device 200 based on information such as an estimated battery power and duration and processing complexity of programs, may enable the mobile device 200 to better determine whether current conditions of the mobile device 200 enable a full recording of the selected program 112. By indicating in advance whether the mobile device 200 is estimated to be able to perform the tasks indicated by the user, the user may be able to change conditions of the recording or mobile device 200 to achieve a desired outcome.

Figure 3:
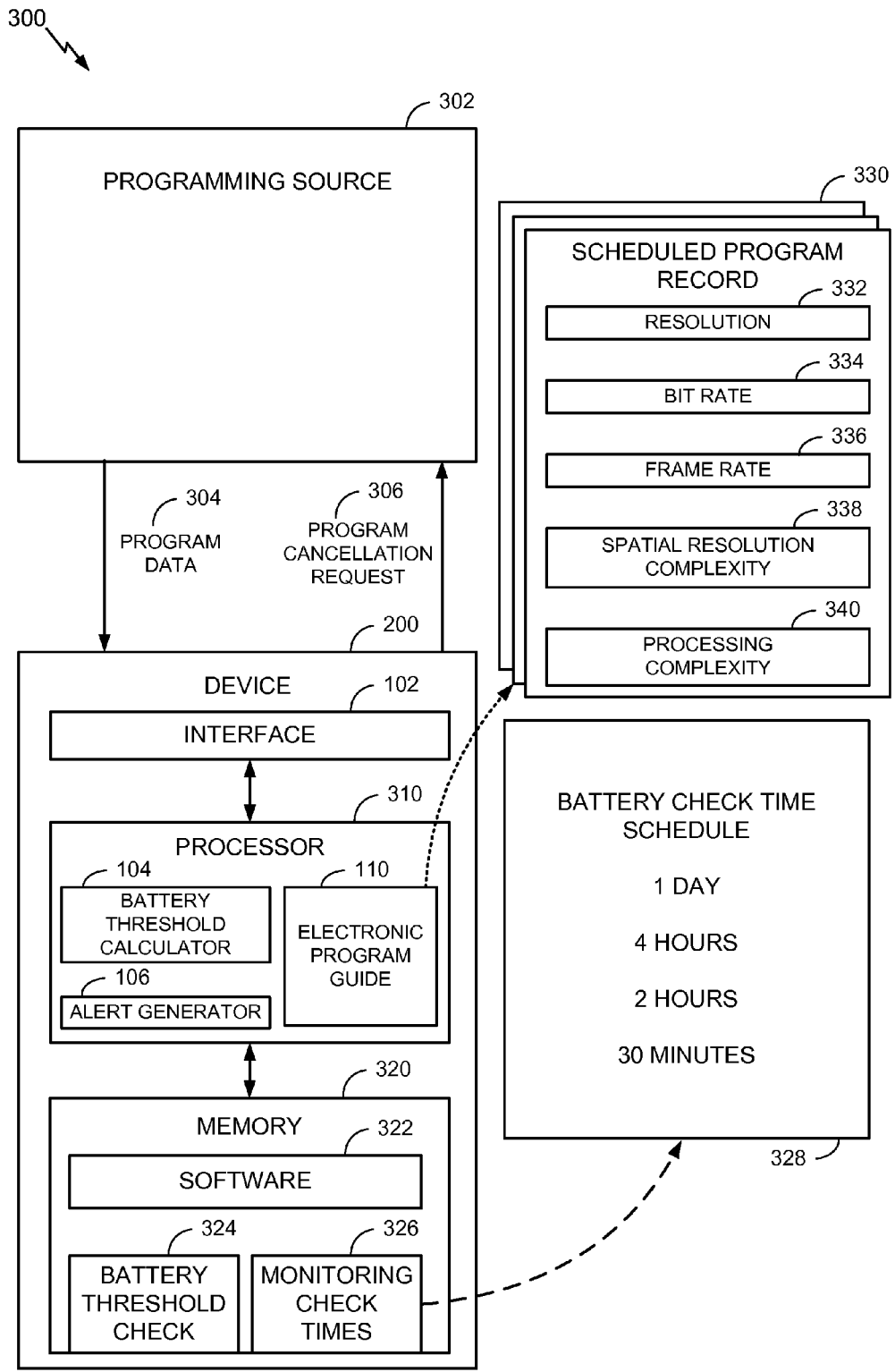
FIG. 3 is an illustrative embodiment of a system that includes a mobile device that generates an alert based on a determination that the mobile device does not have sufficient power resources to record a scheduled program.

Referring to FIG. 3, an illustrative embodiment of a system 300 that includes a mobile device 200 that generates an alert based on a determination that the mobile device 200 would not have sufficient power resources to record a scheduled program is shown. The system 300 includes the device 200 that is configured to communicate with a programming source 302. The device 200 may be configured to receive program data 304 from the programming source 302 and to transmit program orders and cancellation requests 306 to the programming source 302. For example, the programming source 302 may be a content provider that provides subscription, on-demand, or pay programming to the mobile device 200. In a particular embodiment, the device 200 includes the interface 102, a processor 310, and a memory 320.

In a particular embodiment, the electronic program guide 110 is configured to receive a scheduled program record 330 from the program data 304 received from the programming source 302. The scheduled program record 330 may be information (e.g., metadata) received from the programming source 302. The electronic program guide 110 may provide the scheduled program record 330 to the battery threshold calculator 104. The scheduled program record 330 may include information related to a particular program, such as a program scheduled to be recorded or received. The scheduled program record 330 may include a resolution 332, a bit rate 334, a frame rate 336, a spatial resolution complexity 338, and processing complexity 340. The resolution 332 may indicate a number of distinct pixels in each dimension that can be displayed. The bit rate 334 may be a number of bits that are conveyed or processed per unit of time. The frame rate 336 may be a number of frames that are conveyed or processed per unit of time. The spatial resolution complexity 338 may indicate an amount of spatial variation of the underlying images, encoded into the frames of the program. The processing complexity 340 may indicate a degree of processing that is required to process the content of the program. For example, the processing complexity may be a single number, on a scale from one to ten, to simplify calculations. The electronic program guide 110 may provide a "complexity" number that the mobile device 200 uses to determine battery charge. The processing complexity 340 may be in place of (and based on) one or more of the resolution 332, the bit rate 334, the frame rate 336, and the spatial resolution complexity 338. Based on the information in the scheduled program record 330, the battery threshold calculator 104 may determine that a threshold quantity of power (e.g., battery charge threshold) would be required to receive or record the particular program. For example, receiving or recording programs with a high resolution as indicated by the resolution 332, a high bit rate 334, a high frame rate 336, a complex spatial resolution 338, or a high processing complexity 340 may require more power from the device 200 than receiving or recording programs with lower resolution, lower bit rate, lower frame rate, lower spatial resolution complexity or lower processing complexity.

In a particular embodiment, the battery threshold calculator 104 is configured to determine the battery charge threshold. For example, when a selected program is scheduled to begin at a future time, the battery threshold calculator 104 may periodically determine whether the battery charge threshold has changed and no longer satisfies the battery charge threshold. To illustrate, the estimated battery charge threshold may change due to a user plugging in an external power source to the mobile device 200, or other components of the mobile device 200 changing tasks or processing. For example, the mobile device 200 may complete certain tasks and therefore reduce battery usage of the mobile device 200, thus conserving battery power. The battery threshold calculator 104 may be configured to store information (e.g., battery threshold checks 324) related to the comparisons made between the battery threshold and the battery charge at the memory 320.

In a particular embodiment, the alert generator 106 is configured to determine whether a program scheduled for recording is able to be recorded based on a battery charge of the mobile device 200. The battery charge of the mobile device 200 may be measured when the scheduled program is in progress or is scheduled to begin immediately. Alternatively, the battery charge of the mobile device 200 may be estimated when the scheduled program is to begin at a future time. When the alert generator 106 determines that the battery charge does not satisfy the battery charge threshold, the alert generator 106 may transmit an alert to the interface 102 for display to a user of the mobile device 200.

In a particular embodiment, the interface 102 is configured to receive user input in response to the alert and to take action based on the user input. For example, based on the alert, the user may determine that the scheduled program should not be recorded. In this case, the interface 102 may direct the programming source 302 to cancel the program by sending the program cancelation request 306.

The alert generator 106 may also be configured to periodically determine whether the estimated battery device has changed and whether the estimated battery threshold exceeds the estimated battery power. For example, the alert generator 106 may perform the determinations according to a battery check time schedule 328. The battery check time schedule 328 may indicate times prior to the starting time of the scheduled program that may be stored for each scheduled program as monitoring check times 326 at the memory 320. For example, the battery check time schedule may include a check time of one day prior to the starting time, four hours prior to the starting time, two hours prior to the starting time, thirty minutes prior to the starting time, or any other time before the starting time. The alert generator 106 may use the result of a determination performed according to the battery check time schedule to determine whether an alert should be generated for display via the interface 102 to alert the user of changes to conditions related to scheduling of the selected program. For example, the alert generator 106 may indicate to the user that the battery power levels have changed and that recording of the scheduled programming may not be completed because the battery power of the mobile device 200 is too low.

In a particular embodiment, the memory 320 of the mobile device 200 is a computer-readable medium that includes one or more computer-executable instructions (e.g., software 322), that may be executed by a computing system (e.g., the processor 310). The software 322 may include instructions or code that cause the processor 310 to receive a user selection of a scheduled program to be received at the mobile device 200. The software 322 may also include instructions or code that cause the processor 310 to determine a battery charge threshold based on at least one of a duration of the scheduled program and a processing complexity of the scheduled program. In addition, the software 322 may also include instructions or code that cause the processor 310 to determine an estimated battery charge of the mobile device 200 at a starting time of the scheduled program. Further, the software 322 may also include instructions or code that cause the processor 310 to generate a battery alert notification prior to receiving the scheduled program in response to determining that the estimated battery charge of the mobile device 200 does not satisfy the battery charge threshold.

In a particular embodiment, the software 322 also includes instructions that cause the processor 310 to present the electronic program guide 110 that includes a list one or more programs. The software 322 may also include instructions or code that causes the processor 310 to provide an indication of at least one of the duration of the one or more programs and the processing complexity of the one or more programs. The software 322 may also include instructions or code that causes the processor 310 to receive the user selection of the scheduled program. In a particular embodiment, one or more of the battery threshold calculator 104, the alert generator 106, and the electronic program guide 110 of FIG. 1 may be implemented by the software 322 executing at the processor 310.

During operation, the mobile device 200 may present a user with the electronic program guide 110 that enables the user to select a program to receive or record. The battery threshold calculator 104 may determine the battery charge threshold required to receive or record the selected program based on information of the selected program received from the electronic program guide 110, such as the resolution 332, the bit rate 334, the frame rate 336, the spatial resolution complexity 338, and the processing complexity 340 of the selected program. The alert generator 106 may determine the battery charge of the mobile device 200 and whether the battery charge satisfies the battery charge threshold. When the battery charge does not satisfy the battery charge threshold, the alert generator 106 may provide the user with an alert. Based on the alert, the user may change one or more conditions of the mobile device (e.g., charge the battery, turn off other processes, turn down screen brightness), change the conditions of the program (e.g., select the same or a different program that contains less resolution, bit rate, frame rate, spatial resolution complexity, processing complexity), or both.

After being alerted to potential power resource issues, the user may better determine whether a selected program should be recorded at a certain condition or whether conditions related to the mobile device 200 should be changed. Keeping the user informed and allowing the user to make changes prior to recording increases the likelihood of a scheduled task being performed as the user intended. In addition, by knowing beforehand whether a conflict will prevent recording of the programming to be completed, the user may make changes. For example, a user may make changes that may not be conveniently made once the recording is in progress. To illustrate, changing the resolution of the recording may be difficult once the recording has commenced.

Figure 4:
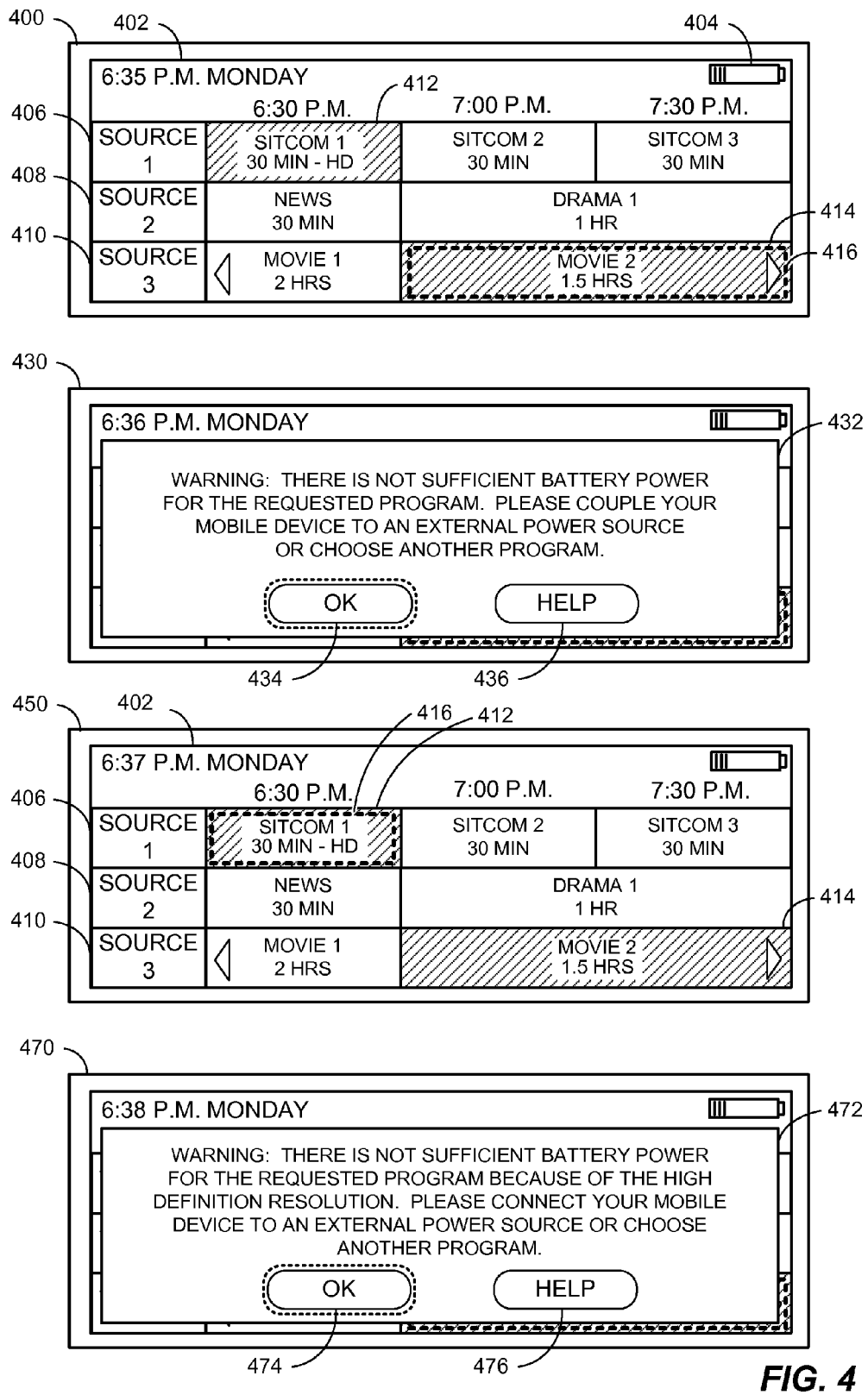
FIG. 4 is a diagram of a display of a mobile device that generates an alert based on a determination that the mobile device does not have sufficient power resources to record a scheduled program.

Referring to FIG. 4, a diagram of a display of a mobile device that generates an alert based on a determination that the mobile device does not have sufficient power resources to receive or record a scheduled program is shown.

A display 400 is shown that includes a representation of an electronic program guide (EPG) 402 and a battery charge indicator 404. The EPG 402 presents programming that is available from a first source 406, a second source 408, and a third source 410. For example, the EPG 402 identifies particular programs that are available from each source 406-410. In addition, the EPG 402 may show programs as "grayed out" or otherwise indicated as unavailable due to power constraints or device conflicts. For example, a program may be "grayed out" when the mobile device does not have a particular decoder that is needed to decode and play the program.

In a particular example, "SITCOM 1" 412 from "SOURCE 1" 406 is indicated as scheduled to begin at 6:30 p.m. and "MOVIE 2" from source three 410 is indicated as scheduled to begin at 7:00 p.m. The "SITCOM 1" 412 and the "MOVIE 2" 414 are indicated as grayed out and are thus unavailable. For example, "SITCOM 1" 412 may be in high definition and therefore unavailable because the processing complexity of the program may require more power to process than the mobile device has available. As another example, "MOVIE 2" may have a duration of one and a half hours and is therefore unavailable because the mobile device does not have enough power to record a program for that length of time.

A user may select an unavailable program. For example, the "MOVIE 2" 414 may be selected (as indicated by dashed box 416). In response to a selection of "MOVIE 2" 414, an alert 432 may be displayed on a display 430. The alert 432 may serve as a warning to the user that the selected program is unavailable. For example, the alert 432 may state, "WARNING: THERE IS NOT SUFFICIENT BATTERY POWER FOR THE REQUESTED PROGRAM. PLEASE COUPLE YOUR MOBILE DEVICE TO AN EXTERNAL POWER SOURCE OR CHOOSE ANOTHER PROGRAM." The user may be presented with one or more user selectable options, such as an "OK" option 434 or "HELP" option 436. If the user selects the "OK" option 434, the user may be presented with the electronic program guide 402 with the selected program de-indicated.

In a particular embodiment, a display 450 may display the electronic program guide 402 after the user selects the "OK" option 434. The user may select 412 (as indicated by dashed box 416) the unavailable program, "SITCOM 1" 412. The alert 472 may be displayed that indicates why the program is unavailable. For example, the alert 472 may state, "WARNING: THERE IS NOT SUFFICIENT BATTERY POWER FOR THE REQUESTED PROGRAM BECAUSE OF THE HIGH DEFINITION RESOLUTION. PLEASE CONNECT YOUR MOBILE DEVICE TO AN EXTERNAL POWER SOURCE OR CHOOSE ANOTHER PROGRAM." The user is presented with an "OK" or "HELP" 476 option. In this particular instance, because "SITCOM 1" 412 is in high definition resolution (HD), the mobile device may expect to require more power to process the HD program than a standard definition program.

Figure 5:
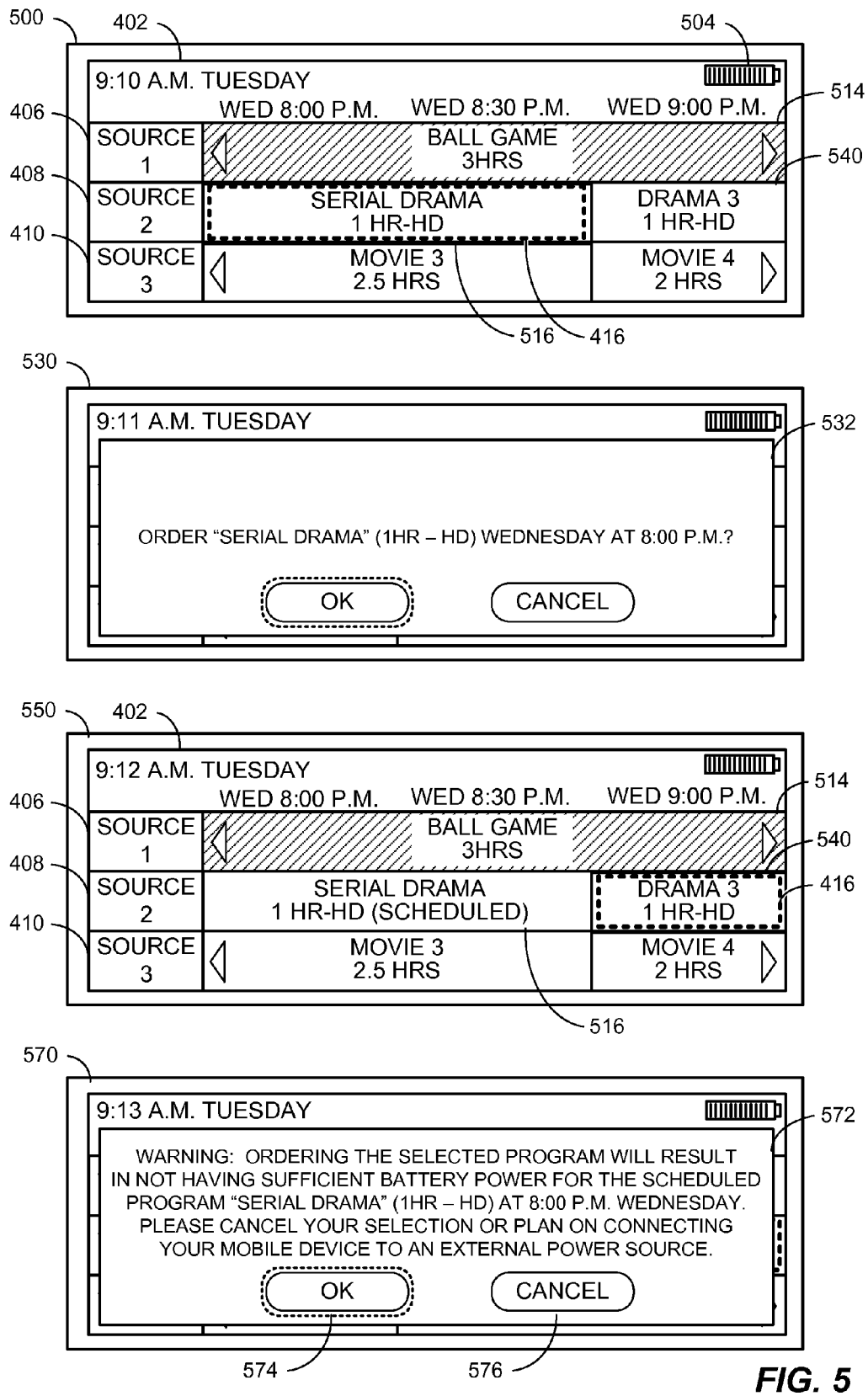
FIG. 5 is a diagram of a display of a mobile device that generates an alert based on a determination that the mobile device does not have sufficient power resources to record a scheduled program.

Referring to FIG. 5, a diagram of a display of a mobile device that generates an alert based on a determination that the mobile device would not have sufficient power resources to receive or record a scheduled program is shown.

In a particular embodiment, a display 500 of the mobile device may include the electronic program guide 402. The electronic program guide 402 may include a "grayed out" program, such as "BALL GAME" 514. A user may select (as indicated by dashed box 416) an available program, such as "SERIAL DRAMA" 516. The "SERIAL DRAMA" 516 may be a pay-per-view order, an on-demand order, or another type of ordered programming. In response to selection of the "SERIAL DRAMA" 516, a popup message 532 may be displayed on display 530 that confirms whether the user intends to order the program. For example, the popup message 532 may state, "ORDER SERIAL DRAMA' (1HR-HD) WEDNESDAY AT 8:00 P.M.?" In a particular embodiment, the "SERIAL DRAMA" 516 is a pay-per-view program and the popup message 532 is an acknowledgment of terms and conditions of ordering the pay-per-view program.

In response to the user confirming the order of the "SERIAL DRAMA" 516, the electronic program guide 402 may be displayed on a display 550. The user may select 416 another program such as "DRAMA 3" 540. In response to the selection of the "DRAMA 3" 540, an alert 572 may be displayed on the display 570 warning the user of a potential power resource conflict. For example, the alert 570 may state, "WARNING: ORDERING THE SELECTED PROGRAM WILL RESULT IN NOT HAVING SUFFICIENT BATTERY POWER FOR THE SCHEDULED PROGRAM 'SERIAL DRAMA' (1HR-HD) AT 8:00 P.M. WEDNESDAY. PLEASE CANCEL YOUR SELECTION OR PLAN ON CONNECTING YOUR MOBILE DEVICE TO AN EXTER- NAL POWER SOURCE." The user is presented with an "OK" 574 or "CANCEL" 576. If the user selects "OK" 574, the mobile device may begin ordering the program. In the event that the user proceeds with the recording but is unable to record the entire show, the alert 570 may enable a content provider to claim that the user was warned not to proceed. In this case, the user may be denied a refund for the order based on a receipt of the alert 570.

Figure 6:
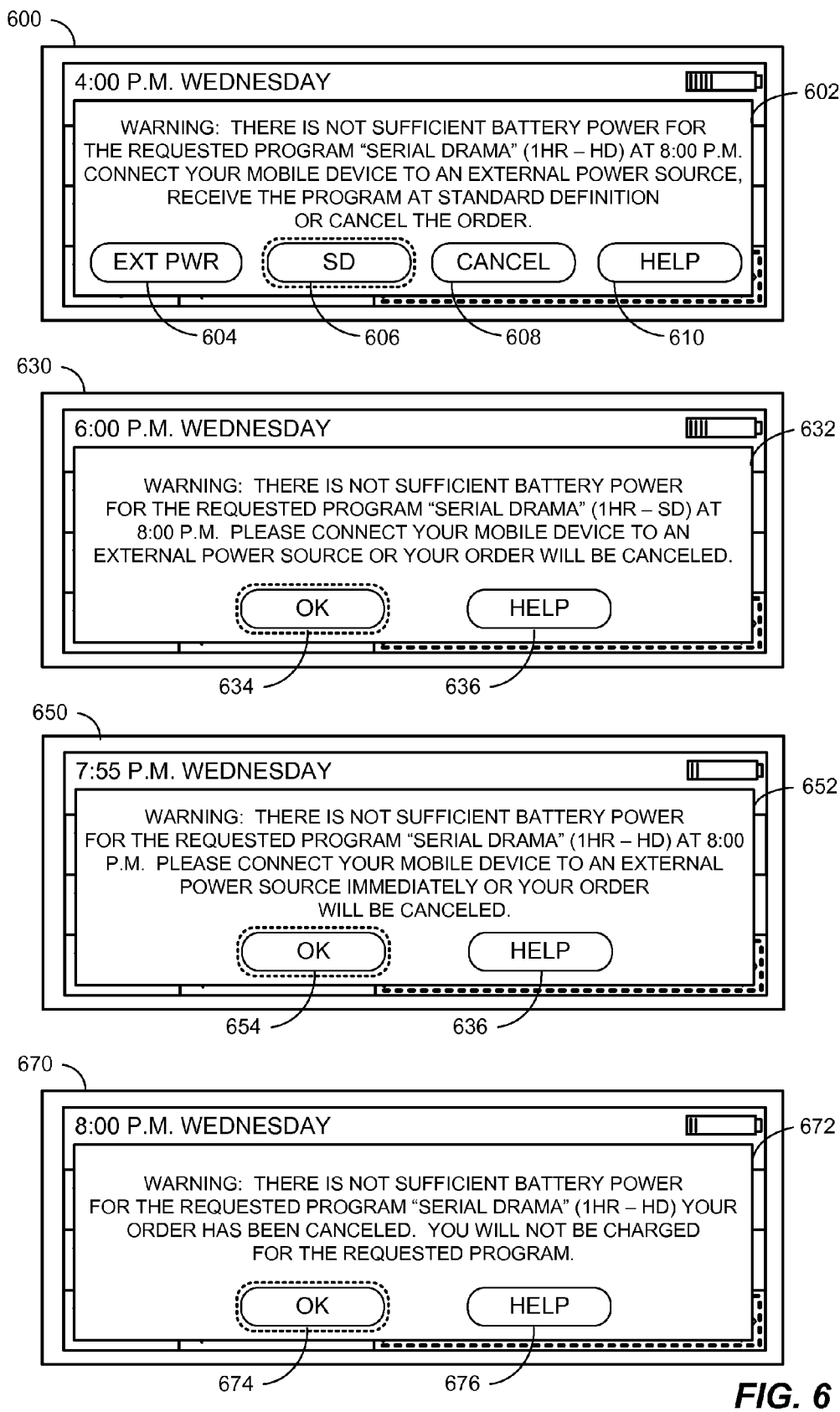
FIG. 6 is a diagram of a display of a mobile device that generates an alert based on a determination that the mobile device does not have sufficient power resources to record a scheduled program.

FIG. 6 is a diagram of a display of a mobile device that generates an alert based on a determination that the mobile device does not have sufficient power resources to record a scheduled program. In particular, various alerts may be presented to a user based on various operating conditions of the mobile device and the type of program that is being ordered.

Continuing the example of FIG. 5, an alert 602 may be displayed on the display 600 four hours before the ordered program is to begin. For example, the alert 602 may state, "WARNING: THERE IS NOT SUFFICIENT BATTERY POWER FOR THE REQUESTED PROGRAM 'SERIAL DRAMA' (1 hr-hd) AT 8:00 P.M. CONNECT YOUR MOBILE DEVICE TO AN EXTERNAL POWER SOURCE, RECEIVE THE PROGRAM AT STANDARD DEFINITION OR CANCEL THE ORDER." In this case, the user may be presented with options to remedy the potential power resource issue. For example, the alert 602 may include options such as an "EXT PWR" option 604, a "SD" option 606, a "CANCEL" option 608, and a "HELP" option 610. Selecting the "EXT PWR" option 604 may enable the user to proceed with recording or download on the basis that the user will connect an external power source. Selecting the "SD" option 606 may change the format of the scheduled program from high definition to standard definition and may alter terms of the pay-per-view program.

An alert 632 may be displayed on the display 630 following the display of the alert 602. In this case, the user selected the "SD" option 606 but during a next scheduled battery check the mobile device determined that switching from HD to SD was unable to resolve the power resource issue. For example, the user have been using more power than expected after selecting "SD" 606. The alert 632 may state, "WARNING: THERE IS NOT SUFFICIENT BATTERY POWER FOR THE REQUESTED PROGRAM 'SERIAL DRAMA' (1HR-HD) AT 8:00 P.M. PLEASE CONNECT YOUR MOBILE DEVICE TO AN EXTERNAL POWER SOURCE OR YOUR ORDER WILL BE CANCELED." The user is presented with the options of selecting "OK" 634 or "HELP" 636. In this particular case, because the user has selected to order the "SERIAL DRAMA" in a standard definition (SD), the user is not presented with an option to change resolution as the resolution is already at the lowest that the mobile device is capable of recording at or content is being provided at the lowest resolution available. In this case, the only option is to plug in external source or the order cannot be processed.

An alert 652 may be displayed on the display 650 if the user selects the "OK" option 634 but does not provide any or enough power charge to the battery to correct a deficiency between a battery charge threshold needed to record the program and the battery charge of the mobile device. For example, the alert 652 may state at 5:00 pm before the scheduled pay per view program is to begin, "WARNING: THERE IS NOT SUFFICIENT BATTERY POWER FOR THE REQUESTED PROGRAM 'SERIAL DRAMA' (1HR-HD) AT 8:00 P.M. PLEASE CONNECT YOUR MOBILE DEVICE TO AN EXTERNAL POWER SOURCE IMMEDIATELY OR YOUR ODER WILL BE CANCELED." In this particular instance, the user is presented with the option to select "OK" 634 or "HELP" 636.

An alert 672 may be displayed on the display 670 if the user selects the "OK" option 654 but does not provide enough power charge to the battery to correct a deficiency between a battery charge threshold needed to receive or record the program and the battery charge of the mobile device. For example, the alert 672 may state at the scheduled start time of the program, "WARNING: THERE IS NOT SUFFICIENT BATTERY POWER FOR THE REQUESTED PROGRAM 'SERIAL DRAMA' (1HR-HD) YOUR ORDER HAS BEEN CANCELED. YOU WILL NOT BE CHARGED FOR THE REQUESTED PROGRAM."

Figure 7:
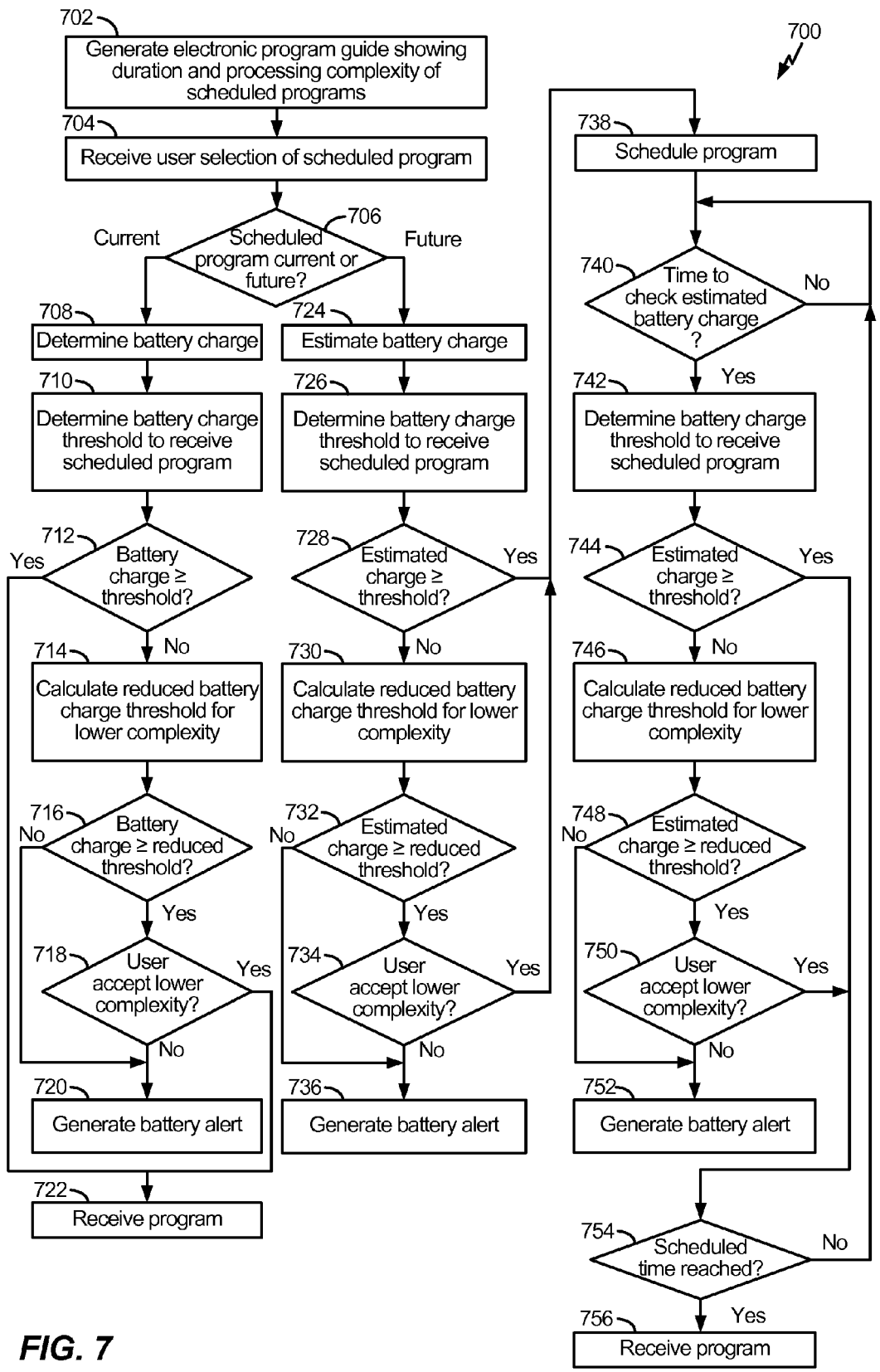
FIG. 7 is a flow chart of a first embodiment of a method to generate an alert based on a determination that a mobile device does not have sufficient power resources to record a scheduled program.

Referring to FIG. 7, a flow chart of a first embodiment of a method to generate an alert based on a determination that a mobile device would not have sufficient power resources to receive or record a scheduled program is shown. In a particular embodiment, the method, designated 700, includes generating an electronic program guide showing duration and processing complexity of scheduled programs, at 702. The method further includes receiving the user selection of a scheduled program, at 704. The method further includes determining whether the scheduled program is a current program or a future scheduled program, at 706. When the scheduled program is a current program, the method proceeds to determine the battery charge, at 708, and to determine a battery charge threshold to receive the scheduled programming, at 710. The battery charge is compared to a battery charge threshold, at decision block 712. When the battery charge is greater or equal to the threshold, at 712, processing proceeds to 722. When the battery charge is less than the battery charge threshold, the method proceeds to calculate a reduced battery charge threshold for lower complexity, at 714. For example, the mobile device 100 of FIG. 1 may record or receive the selected program 112 in standard definition instead of high definition. At 716, the battery charge is compared to the reduced battery charge threshold. When the battery charge is greater than the reduced battery charge threshold, the user is prompted to inquire whether the user will accept a lower complexity of the scheduled program, at 718. When the user accepts the lower complexity, the program is received, at 722. When the user will not accept the lower complexity, a battery alert is generated, at 720. Referring to decision block 716, when the battery charge is greater than or equal to the reduced battery charge threshold, the battery alert is generated, at 720.

Referring to decision block 706, when the scheduled program is a future program, the method proceeds to estimate the battery charge, at 724. For example, in FIG. 2, the battery charge estimator 108 may estimate the battery charge for the starting time 228 of the scheduled program instead of the current time. The method further determines a battery charge threshold to receive the scheduled program, at 726. The estimated battery charge is compared to the battery charge threshold, at 728. When the estimated battery charge is greater than or equal to the battery charge threshold at 728, the method proceeds to schedule the program at 738. For example, the mobile device 200 of FIG. 2 may order the selected program 112. As another example, the mobile device 200 of FIG. 2 may enter the selected program into a recording schedule. When the estimated battery charge is less than the battery charge threshold, at 728, the method calculates a reduced battery charge threshold for lower complexity, at 730. When the estimated battery charge is greater than or equal to the reduced battery charge threshold, at 732, the method generates a battery alert, at 736. When the estimated battery charge is less than the reduced battery charge threshold, at 732, the user is asked to accept a lower complexity of the scheduled program, at 734. When the user accepts the lower complexity, then the program is scheduled, at 738. However, when the user does not accept the lower complexity format at 734, the method proceeds to generate the battery alert, at 736.

After the program is scheduled, at 738, a time to check the estimated battery charge is evaluated, at 740. If the time to check the estimated battery charge has elapsed, then the method determines the battery charge threshold to receive the scheduled program, at 742, and compares the estimated charge to the battery charge threshold, at 744. If the estimated charge is greater than or equal to the battery charge threshold at 744, the method determines whether a scheduled time for the program is reached, at 754. When the starting time has been reached, then the program is received at 756 and may be subsequently played at the device, recorded, or both. When the starting time has not been reached, at 754, the method returns to decision step 740.

When the estimated charge is less than the battery charge threshold, at 744, the method calculates a reduced battery charge threshold for a lower complexity format, at 746. For example, if the scheduled program was originally formatted at a high complexity (e.g., high definition television or high resolution), then the battery charge threshold may be recalculated for receiving the program in a lower complexity format (e.g., standard definition format or lower resolution format).

The estimated charge for the battery is compared to the reduced battery charge threshold, at 748. If the estimated charge of the battery is greater than or equal to the reduced battery charge threshold, the user is prompted whether to accept the lower complexity format, at 750. If the user accepts the lower complexity format, the method determines whether the scheduled time is reached, at 754. When the scheduled time is reached, the program is received at 756. If the user does not accept the lower complexity format, at 750, then a battery alert is generated at 752. In addition, if the estimated charge is less than the threshold, at 748, the battery alert is generated, at 752.

Thus, when the scheduled program is to occur at a future time, the illustrated method 700 may proactively evaluate an estimated battery charge and compare the estimated charge to a battery charge threshold. Based on the comparison between the estimated battery charge and the battery charge threshold, the method 700 may selectively alert a user to a battery alert condition. In addition, the method 700 may allow a user to accept a lower complexity format of the scheduled program so that the scheduled program may be received or recorded at the mobile device.

Figure 8:
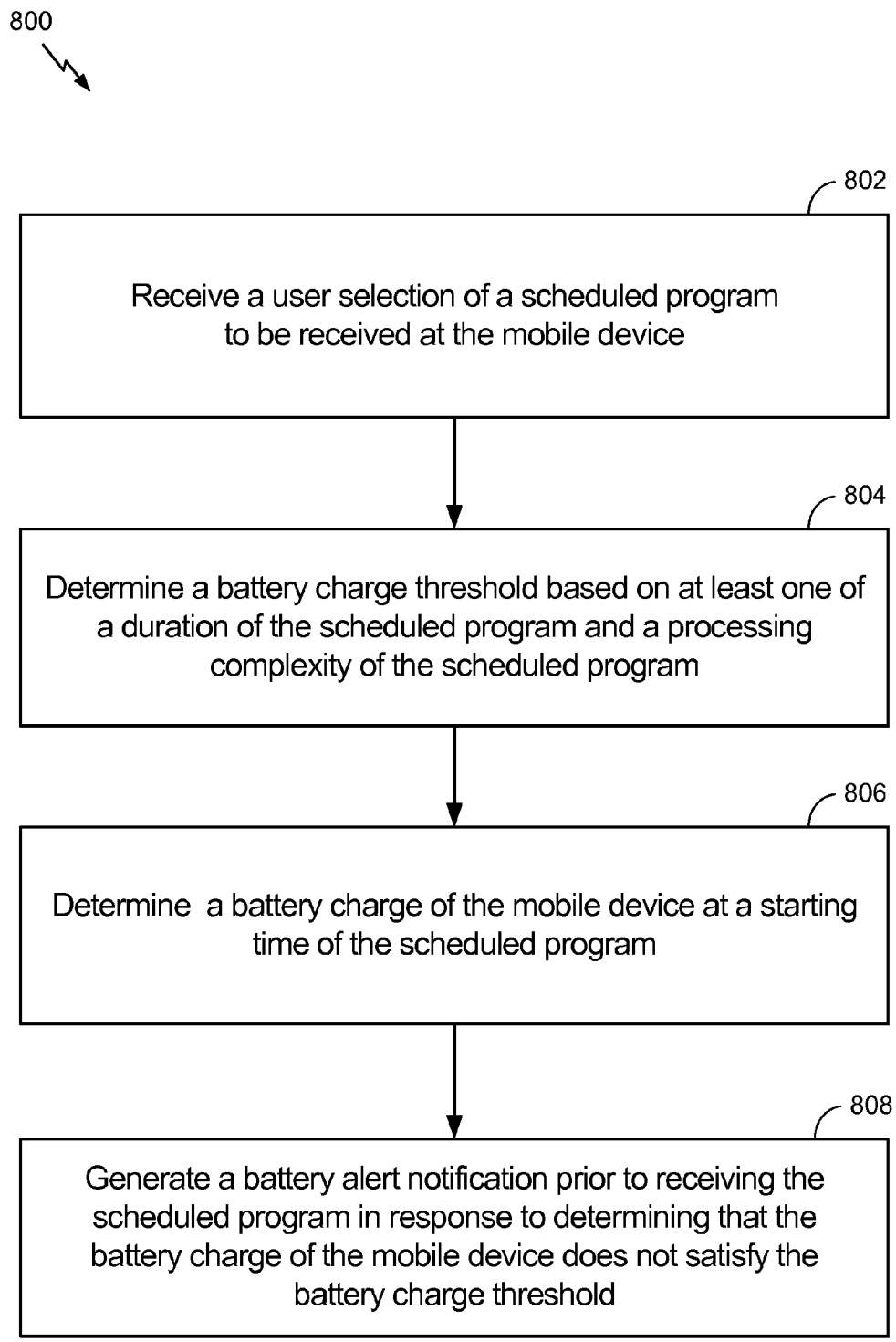
FIG. 8 is a flow chart of a second embodiment of a method to generate an alert based on a determination that a mobile device does not have sufficient power resources to record a scheduled program.

Referring to FIG. 8, a flow chart of a second embodiment of a method to generate an alert based on a determination that a mobile device would not have sufficient power resources to receive or record a scheduled program is shown. The method 800 includes receiving a user selection of a scheduled program to be received at the mobile device, at 802. For example, in FIG. 1, the electronic program guide 110 of the mobile device 100 receives a user selection 114 of a scheduled program to be received at the mobile device 100. The method 800 includes determining a battery charge threshold based on at least one of a duration of the scheduled program and a processing complexity of the scheduled program, at 804. For example, in FIG. 1, the battery threshold calculator 104 of the mobile device 100 determines a battery charge threshold based on at least one of a duration 116 of the scheduled program and a processing complexity 118 of the scheduled program. In this case, a long, HD program may require more power than a short, SD program.

The method 800 also includes determining a battery charge of a mobile device at a starting time of the scheduled program, at 806. For example, in FIG. 1, the battery charge estimator 108 of the mobile device 100 determines a battery charge of the mobile device 100 at a staring time of the scheduled program. The method 800 includes generating a battery alert notification prior to receiving the scheduled program in response to determining that the battery charge of the mobile device does not satisfy the battery charge threshold, at 808. For example, the alert generator 106 of the mobile device 100 generates a battery alert notification 120 prior to receiving the scheduled program in response to determining that the battery charge of the mobile device 100 does not satisfy the battery charge threshold.

Figure 9:
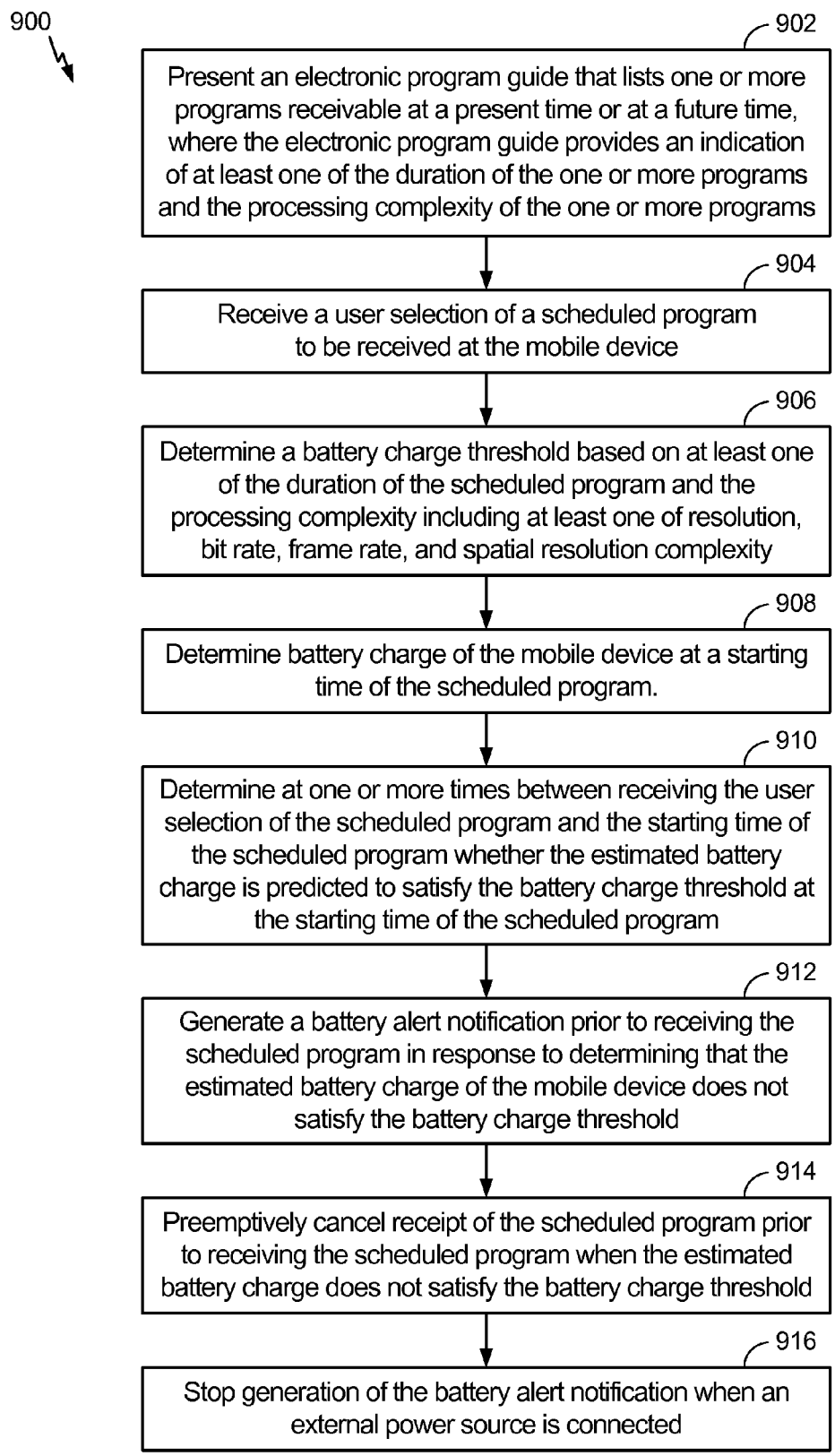
FIG. 9 is a flow chart of a third embodiment of a method to generate an alert based on a determination that a mobile device does not have sufficient power resources to record a scheduled program.

Referring to FIG. 9, a flow chart of a third embodiment of a method to generate an alert based on a determination that a mobile device would not have sufficient power resources to receive or record a scheduled program is shown. The method 900 includes presenting an electronic programming guide that lists one or more programs that are receivable at a current time or a future time, at 902. For example, in FIG. 3, the mobile device 200 presents an electronic program guide 110. The electronic programming guide provides an indication of at least one of the duration of the one or more programs and the processing complexity of the one or more programs.

The method 900 includes receiving a user selection of a scheduled program to be received at the mobile device, at 904. For example, in FIG. 1, the electronic program guide 110 of the mobile device 100 receives the user selection 114 of the scheduled program. The method 900 further includes determining a battery charge threshold based on at least one of the duration of the scheduled program and the processing complexity of the scheduled program, at 906. The processing complexity may include factors such as a resolution, bit rate, frame rate, and spatial resolution complexity. For example, in FIG. 3, the battery threshold calculator 104 of the mobile device 200 determines a battery charge threshold based on at least one of the duration of the scheduled program 116 of FIG. 1 and the resolution 332, the bit rate 334, the frame rate 336, the spatial resolution complexity 338, and the processing complexity 340.

The method 900 further determines the battery charge of the mobile device at a starting time of the scheduled program, at 908. For example, in FIG. 2, the alert generator 106 of the mobile device 200 determines the battery charge of the mobile device 200 based on the starting time 228 of the scheduled program. The scheduled program starting time is a time when the program is to be received and may be at a current time or a future time. The battery charge is estimated when the start time is at a future time. The battery charge may be estimated based on a measured battery charge at the current time and based on an estimated battery drain that would likely occur between the current time and the starting time of the scheduled program. For example, by estimating the battery drain, the mobile device may determine how much power different processes being executed on the mobile device will consume. In this case, the battery charge estimator 108 of FIG. 1 may calculate the estimated battery drain as part of estimating the battery charge of the mobile device 100.

The method 900 also includes determining at one or more times between receiving the user selection of the scheduled program and the starting time of the scheduled program whether the estimated battery charge is predicted to satisfy the battery charge threshold at the starting time of the scheduled program, at 910. For example, in FIG. 3, the alert generator 106 determines whether the estimated battery charge is predicted to satisfy the battery charge threshold at the starting time 228 of the scheduled program. The method 900 includes generating a battery alert notification prior to receiving the scheduled program in response to determining the estimated battery charge of the mobile device does not satisfy the battery charge threshold, at 912.

The method 900 may further include when the estimated battery charge does not satisfy the battery charge threshold, preemptively cancelling receipt of the scheduled program prior to receiving the scheduled program, at 914. For example, in FIG. 3, the mobile device 200 transmits a program cancellation request 306 when the estimated battery charge does not satisfy the battery charge threshold. Generation of the battery alert notification may be stopped when an external power supply is connected, at 916. For example, when a mobile device is connected to an external power source, a queued battery alert notification may be cancelled or an in progress battery alert notification may be removed from a display since the battery is battery charged.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope possible consistent with the principles and novel features as defined by the following claims.

What is claimed is:

1. An apparatus comprising:
   an interface configured to receive a user selection of a scheduled program to be received at a mobile device;
   a battery threshold calculator configured to determine a battery charge threshold based on both a duration of the scheduled program and a processing complexity of the scheduled program; and
   an alert generator configured to generate a battery alert notification prior to receiving the scheduled program in response to a determination that a battery charge of the mobile device at a starting time of the scheduled program does not satisfy the battery charge threshold.

2. The apparatus of claim 1, wherein the interface is further configured to present an electronic program guide that lists one or more programs and wherein the electronic program guide provides an indication of at least one of the duration of the one or more programs and the processing complexity of the one or more programs.

3. The apparatus of claim 1, wherein the processing complexity includes at least one of:
   a resolution type including at least one of standard definition or high definition;
   a bit rate;
   a frame rate; and
   a spatial resolution complexity.

4. The apparatus of claim 1, wherein when the scheduled program is to be received at a present time, the battery threshold calculator is configured to determine the battery charge threshold based on a remaining duration of the scheduled program.

5. The apparatus of claim 4, wherein when the alert generator determines that the battery charge at the present time does not satisfy the battery charge threshold, the alert generator immediately generates the battery alert notification.

6. The apparatus of claim 1, wherein when the scheduled program is to be received at a future time, the battery charge at the starting time of the scheduled program is estimated based on a measured battery charge at a present time and an estimated amount of battery drain between the present time and the starting time of the scheduled program.

7. The apparatus of claim 6, wherein the alert generator is configured to determine at one more times in advance of the future time whether the estimated battery charge satisfies the battery charge threshold.

8. The apparatus of claim 1, wherein the alert generator is further configured to preemptively cancel receipt of the scheduled program prior to the receipt of the scheduled program when the estimated battery charge does not satisfy the battery charge threshold.

9. The apparatus of claim 1, wherein the alert generator is further configured to detect when an external power source is connected and to receive the scheduled program when the external power source is connected.

10. The apparatus of claim 1, further comprising a device selected from the group consisting of a portable television, a portable media player, a communications device, and a computer, into which the interface, the battery threshold calculator, and the alert generator are integrated.

11. A method of scheduling receipt of content at a mobile device, the method comprising:
    receiving a user selection of a scheduled program to be received at the mobile device;
    determining a battery charge threshold based on both a duration of the scheduled program and a processing complexity of the scheduled program;
    determining a battery charge of the mobile device at a starting time of the scheduled program; and
    generating a battery alert notification prior to receiving the scheduled program in response to determining that the battery charge of the mobile device does not satisfy the battery charge threshold.

12. The method of claim 11, further comprising presenting an electronic program guide that lists one or more programs, wherein the electronic program guide provides an indication of at least one of the duration of the one or more programs and the processing complexity of the one or more programs, and wherein the user selection is received via the electronic programming guide.

13. The method of claim 11, wherein the processing complexity includes at least one of:
    a resolution type including at least one of standard definition or high definition;
    a bit rate;
    a frame rate; and
    a spatial resolution complexity.

14. The method of claim 11, wherein when the scheduled program is to be received at a future time, the battery charge at the starting time of the scheduled program is estimated based on a measured battery charge at a present time and an estimated battery drain between the present time and the starting time of the scheduled program.

15. The method of claim 11, further comprising determining at one or more times between receiving the user selection of the scheduled program and the starting time of the scheduled program whether the battery charge is predicted to satisfy the battery charge threshold at the starting time of the scheduled program.

16. The method of claim 15, further comprising preemptively canceling receipt of the scheduled program prior to receiving the scheduled program when an estimated battery charge or a measured battery charge does not satisfy the threshold battery charge.

17. The method of claim 11, further comprising stopping generation of the battery alert notification in response to detected connection of an external power source.

18. An apparatus for scheduling receipt of content at a mobile device, the apparatus comprising:
 means for receiving a user selection of a scheduled program to be received at the mobile device;
 means for determining a battery charge threshold based on both a duration of the scheduled program and a processing complexity of the scheduled program;
 means for determining a battery charge of the mobile device at a starting time of the scheduled program; and
 means for generating a battery alert notification prior to receiving the scheduled program in response to determining that the battery charge of the mobile device does not satisfy the battery charge threshold.

19. The apparatus of claim 18, further comprising means for presenting an electronic program guide that lists one or more programs, wherein the electronic program guide provides an indication of at least one of the duration of the one or more programs and the processing complexity of the one or more programs, and wherein means for receiving the user selection receives the user selection via the electronic programming guide.

20. The apparatus of claim 18, wherein the scheduled program is to be received at a future time, the battery charge is estimated based on a measured battery charge at a present time and an estimated battery drain between the present time and the starting time of the scheduled program.

21. The apparatus of claim 18, further comprising means for determining at one or more times between receiving the user selection of the scheduled program and the starting time of the schedule program whether the battery charge is predicted to satisfy the battery charge threshold at the starting time of the scheduled program.

22. The apparatus of claim 18, further comprising means for preemptively canceling receipt of the scheduled program prior to receiving the scheduled program when an estimated battery charge or a measured battery charge does not satisfy the threshold battery charge.

23. A non-transitory computer-readable medium comprising one or more computer-executable instructions, that when executed by a computing system, cause the computing system to:
 receive a user selection of a scheduled program to be received at the mobile device;
 determine a battery charge threshold based on both a duration of the scheduled program and a processing complexity of the scheduled program;
 determine an estimated battery charge of the mobile device at a starting time of the scheduled program; and
 generate a battery alert notification prior to receiving the scheduled program in response to determining that the estimated battery charge of the mobile device does not satisfy the battery charge threshold.

24. The non-transitory computer-readable medium of claim 23, further comprising instructions to present an electronic program guide to:
 list one or more programs;
 provide an indication of at least one of the duration of the one or more programs and the processing complexity of the one or more programs; and
 receive the user selection of the schedule program.

25. The non-transitory computer-readable medium of claim 23, further comprising instructions to preemptively cancel receipt of the scheduled program prior to receiving the scheduled program when an estimated battery charge or a measured battery charge does not satisfy the threshold battery charge.

* * * * *